United States Patent
Neuman et al.

(10) Patent No.: US 12,128,771 B2
(45) Date of Patent: Oct. 29, 2024

(54) ROAD TRIP DETECTION FOR STATE OF CHARGE MANAGEMENT IN A MOTOR VEHICLE

(71) Applicant: GM GLOBAL TECHNOLOGY OPERATIONS LLC, Detroit, MI (US)

(72) Inventors: Christopher R. Neuman, Denver, CO (US); Gautam Kulkarni, Rocheseter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 17/959,493

(22) Filed: Oct. 4, 2022

(65) Prior Publication Data

US 2024/0109431 A1 Apr. 4, 2024

(51) Int. Cl.
| | |
|---|---|
| B60L 15/20 | (2006.01) |
| B60L 58/12 | (2019.01) |
| B60R 16/023 | (2006.01) |
| G07C 5/10 | (2006.01) |

(52) U.S. Cl.
CPC .......... B60L 15/2045 (2013.01); B60L 58/12 (2019.02); B60R 16/0231 (2013.01); G07C 5/10 (2013.01)

(58) Field of Classification Search
CPC .. B60L 15/2045; B60L 58/12; B60R 16/0231; G07C 5/10; Y02T 10/70
See application file for complete search history.

(56) References Cited

U.S. PATENT DOCUMENTS

| | | | |
|---|---|---|---|
| 2003/0015874 A1* | 1/2003 | Abe | B60W 20/12 290/40 C |
| 2013/0020864 A1* | 1/2013 | Smajlovic | B60L 1/04 307/9.1 |
| 2013/0024055 A1* | 1/2013 | Hysko, Jr. | B60L 58/15 180/65.265 |
| 2014/0257608 A1* | 9/2014 | Dufford | B60W 20/12 903/930 |
| 2015/0097512 A1* | 4/2015 | Li | B60L 58/13 320/108 |
| 2015/0105947 A1* | 4/2015 | Chang | B60L 58/15 903/903 |
| 2015/0105948 A1* | 4/2015 | Chang | B60L 50/52 701/22 |
| 2015/0298555 A1* | 10/2015 | Bennett | B60L 58/13 701/22 |
| 2016/0167641 A1* | 6/2016 | Yoon | G08G 1/09623 903/903 |
| 2016/0236586 A1* | 8/2016 | Soo | B60L 1/006 |
| 2019/0047572 A1* | 2/2019 | Bennett | B60K 6/46 |
| 2019/0111912 A1* | 4/2019 | Rockwell | B60W 20/15 |

(Continued)

Primary Examiner — Abdalla A Khaled
(74) Attorney, Agent, or Firm — Quinn IP Law

(57) ABSTRACT

A method for adjusting state of charge (SOC) limits aboard a motor vehicle having a propulsion battery pack includes receiving a pre-drive information set via a host computer and identifying, from the pre-drive information set, a probability that the motor vehicle is about to embark on a road trip. The road trip is a drive event in which the motor vehicle will travel outside of a predetermined area. The method further includes expanding the SOC limits of the propulsion battery pack when the motor vehicle is about to embark on the road trip, such that a total SOC window of the propulsion battery pack is increased for a duration of the road trip.

20 Claims, 3 Drawing Sheets

(56) References Cited

U.S. PATENT DOCUMENTS

| | | | |
|---|---|---|---|
| 2021/0327161 A1* | 10/2021 | Diamond | B60L 53/60 |
| 2021/0394642 A1* | 12/2021 | Maeda | B60L 58/12 |
| 2022/0348185 A1* | 11/2022 | Le | B60W 20/13 |
| 2024/0101100 A1* | 3/2024 | Rathod | B60W 20/13 |

* cited by examiner

ROAD TRIP DETECTION FOR STATE OF CHARGE MANAGEMENT IN A MOTOR VEHICLE

INTRODUCTION

The present disclosure relates to automated systems and methodologies for use with electrified powertrain systems having an electrochemical battery pack. In particular, the present disclosure relates to the automated verification, scheduling, and enforcement of battery state of charge (SOC) limits based on detected road trip information.

Battery electric vehicles having a rechargeable, multi-cell electrochemical propulsion battery pack as an onboard direct current (DC) power supply typically include a battery controller operable for regulating charging and discharging operations of the battery pack, as well as ongoing thermal management. A state of charge (SOC) of a given battery cell or battery pack refers to a total capacity as a function of a rated capacity, and therefore is typically expressed as a percentage value. An SOC of 100%, for instance, represents a fully charged battery cell or battery pack. Conversely, an SOC of 0% corresponds to a fully depleted battery cell or battery pack.

SUMMARY

Disclosed herein are automated systems and methods for detecting imminent or ongoing long drive events ("road trips") of a motor vehicle and for situationally expanding a set of programmed initial state of charge (SOC) limits in response thereto.

As appreciated in the art, an SOC operating window may be selected by a user of a motor vehicle, e.g., 25-75% SOC, with an onboard battery controller thereafter enforcing the window. In practical terms, controller-based enforcement of a reduced SOC window could trigger charging operations at SOC levels well above 0%, and could likewise terminate charging operations at SOC levels of less than 100%. As appreciated by those skilled in the art, the use of a reduced SOC window may be beneficial for various performance reasons, including potentially extending the operating life of the battery pack and reducing charging times.

An aspect of the disclosure includes a method for controlling a propulsion battery pack aboard a motor vehicle. The method may include recording initial state of charge (SOC) limits of the propulsion battery pack, e.g., in a non-transitory computer storage medium of an onboard controller of the motor vehicle and/or a host computer, and receiving a pre-drive information set of the motor vehicle. The method also includes identifying, from the pre-drive information set, a probability of the motor vehicle embarking on a road trip, with road trip as contemplated herein being a vehicle drive event in which the motor vehicle travels outside of a predetermined drive area. The method in this particular embodiment further includes temporarily expanding the initial SOC limits when the motor vehicle is about to embark on the road trip or during the road trip, such that a total SOC operating window of the propulsion battery pack is temporarily increased for a duration of the road trip.

In one or more embodiments, receiving the pre-drive information set may include accessing a historical database of past drive events of the motor vehicle. The method may also include constructing a geofenced area using corresponding drive distances of the past drive events, and thereafter using the geofenced area as the predetermined drive area noted above. Some implementations of the present method may include re-enabling the initial SOC limits when the motor vehicle returns to the geofenced area at the end of the road trip.

Receiving the pre-drive information set may include accessing a calendar or database of holidays, vacations, and/or weekends.

An optional aspect of the disclosure includes receiving signals from a controller area network (CAN) bus indicative of the road trip, e.g., door opening/closing signals, trunk opening/closing signals, and/or vehicle weight.

Identifying the probability of the motor vehicle embarking on the road trip may be accomplished by the host computer using machine learning or statistical methods in one or more embodiments.

Another aspect of the disclosure includes transmitting a prompt to a user device in response to the motor vehicle being about to embark on the road trip, receiving a confirmation signal from the user device that the motor vehicle is about to embark on the road trip, and temporarily expanding the initial SOC limits in response to the confirmation signal.

A system for controlling a propulsion battery pack aboard a motor vehicle is also disclosed herein. The system includes a processor and a non-transitory computer-readable storage medium on which is recorded an instruction set. Executing the instruction set by the processor causes the processor to perform the above-summarized method.

Another possible embodiment of the method includes recording initial SOC limits of the propulsion battery pack, and then receiving a pre-drive information set of the motor vehicle. In this embodiment, receiving the information includes accessing a historical database of past drive events of the motor vehicle, accessing a calendar or database of holidays, vacations, and/or weekends, receiving signals from a controller area network (CAN) bus indicative of the road trip, and identifying, from the pre-drive information set, a probability of the motor vehicle embarking on a road trip. The method also includes temporarily expanding the initial SOC limits when the motor vehicle is about to embark on the road trip, such that a total SOC operating window of the propulsion battery pack is increased for a duration of the road trip, and re-enabling the initial SOC limits when the motor vehicle returns to the geofenced area.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
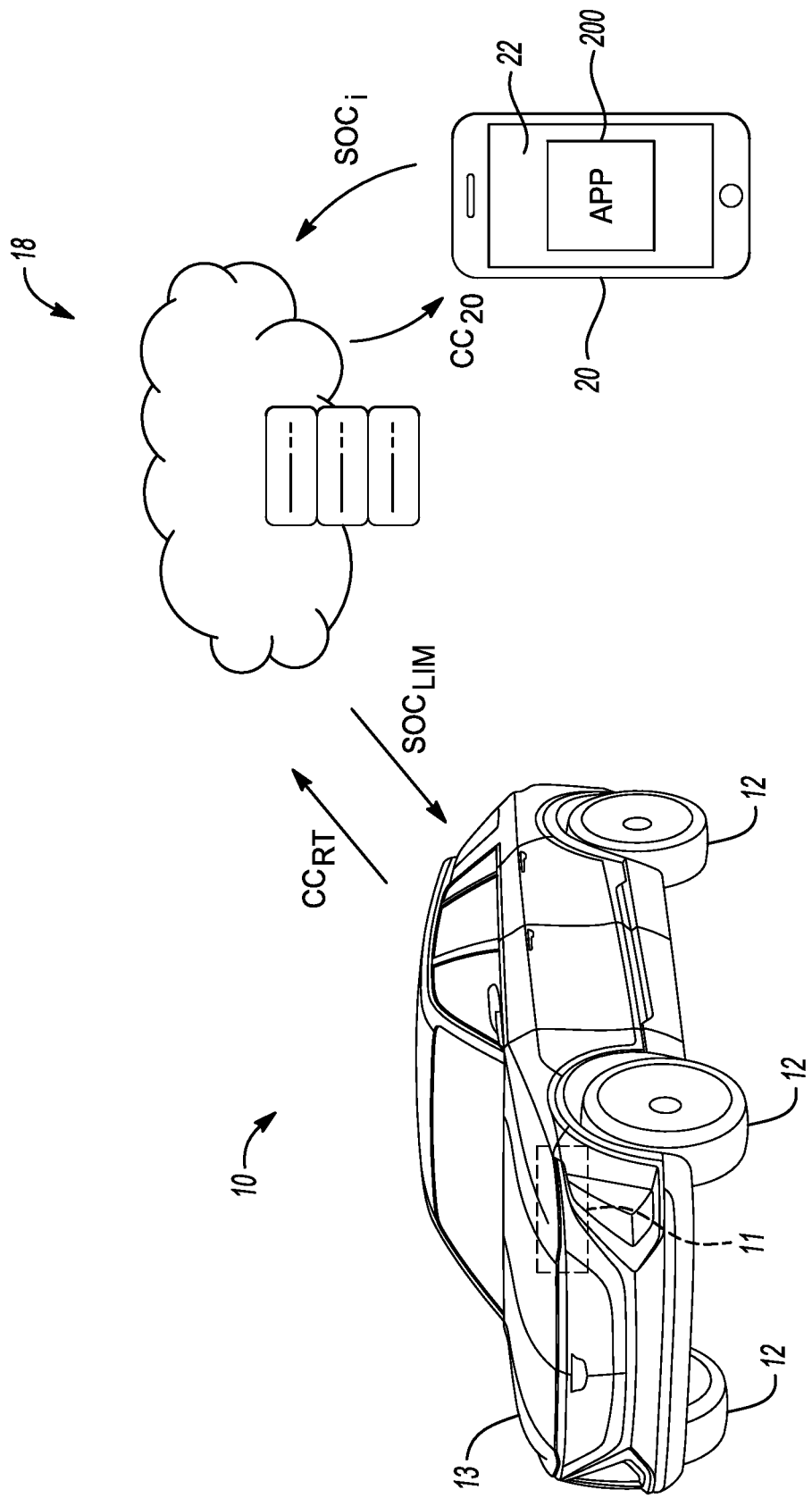
FIG. 1 illustrates a motor vehicle and a host computer configured for use in performing a method in accordance with the present disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts a motor vehicle 10, e.g., a battery electric vehicle as shown, with motor vehicle 10 having an electrified powertrain system 11. As appreciated in the art, users of battery electric vehicles are often able to set state of charge (SOC) limits as maximum and possibly minimum SOC setpoints, e.g., 30% to 80% SOC or 25% to 75% SOC, in order to help extend the operating life of a resident propulsion battery pack, e.g., the propulsion battery pack 24 of FIG. 2. Once the SOC limits have been set, an onboard controller, generally referred to herein and in the art as a Battery Management System (BMS) 50 as likewise shown in FIG. 2, limits charging to the new maximum SOC limit, and also limits discharging to the new minimum SOC limit.

Figure 4:
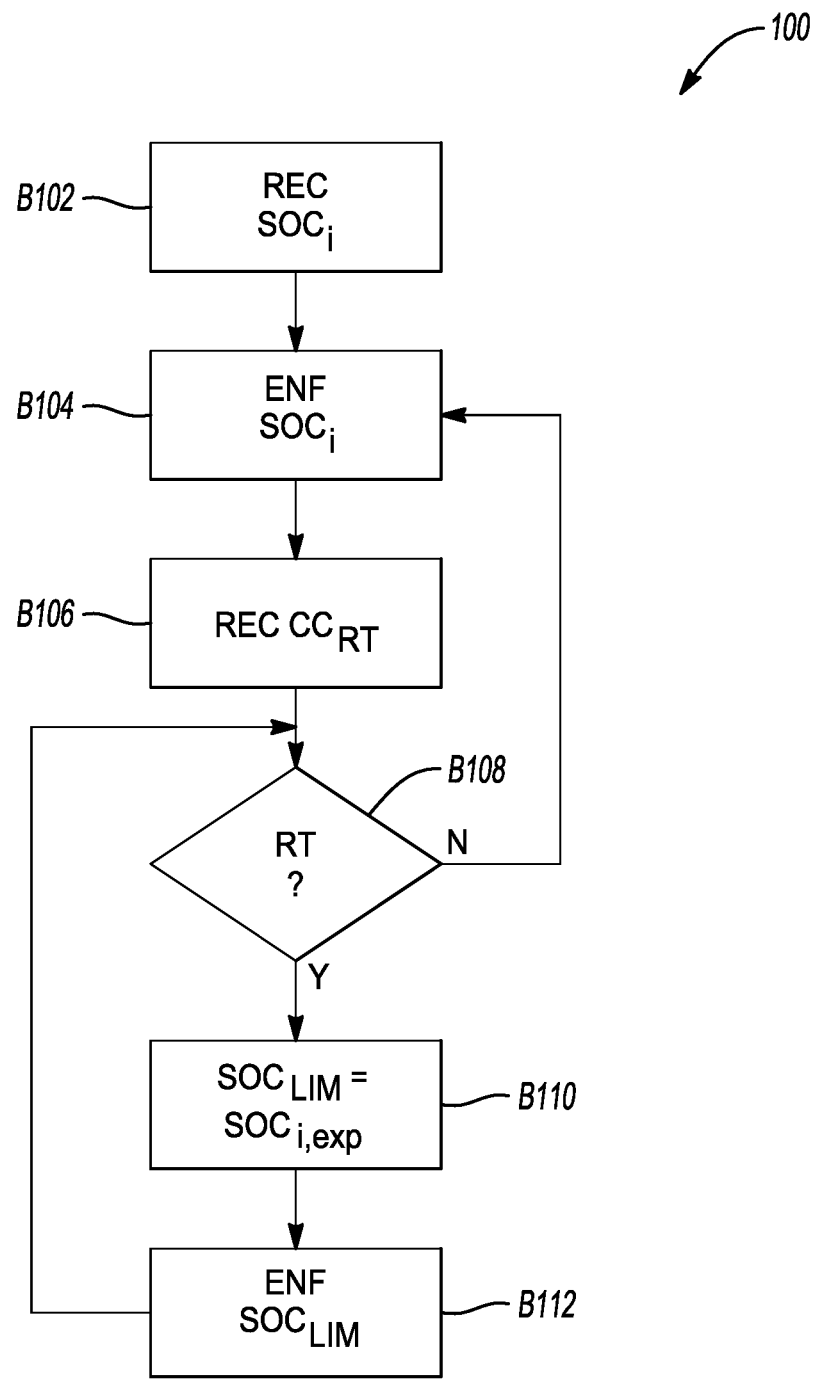
FIG. 4 is a flow chart describing an exemplary embodiment of a method in accordance with the disclosure.

Thus, a maximum SOC limit of 75% is treated by the BMS 50 as the battery pack 24 being "fully charged". While such an SOC operating window may be suitable for normal everyday driving, for example when commuting to and from work or school, at times a user may wish to drive the motor vehicle 10 over much longer trip distances. Such long drive events, which are referred to herein as "road trips", are detected and thereafter used as part of the disclosed control strategy to temporarily expand the initial SOC limits noted above, and to thereby increase the available operating range of the motor vehicle 10. To that end, the motor vehicle 10 may be equipped to receive SOC limits ($SOC_{LIM}$) from a host computer 18 and transmit or otherwise communicate a pre-drive information set ($CC_{RT}$) to the host computer 18 as part of a method 100, an example of which is shown in FIG. 4 and described below.

The representative motor vehicle 10 of FIG. 1 includes a vehicle body 13 and road wheels 12 connected thereto. The vehicle body 13, e.g., a sedan, coupe, truck, crossover, or other configuration. As part of the present control strategy, the motor vehicle 10 is in communication with a host computer 18, e.g., a cloud server as shown or another control unit of the motor vehicle 10. The host computer 18 in turn is in communication with a user device 20, e.g., a smart phone, tablet computer, laptop computer, desktop computer, wearable device, etc. A user, via a display screen 22 of the user device 20, may access a software application ("APP") 200 to remotely interface with the motor vehicle 10 within the scope of the disclosure. At least part of such an interaction includes setting up initial SOC limits $SOC_i$ and possibly receiving user prompts $CC_{20}$ as part of the present method 100.

Figure 2:
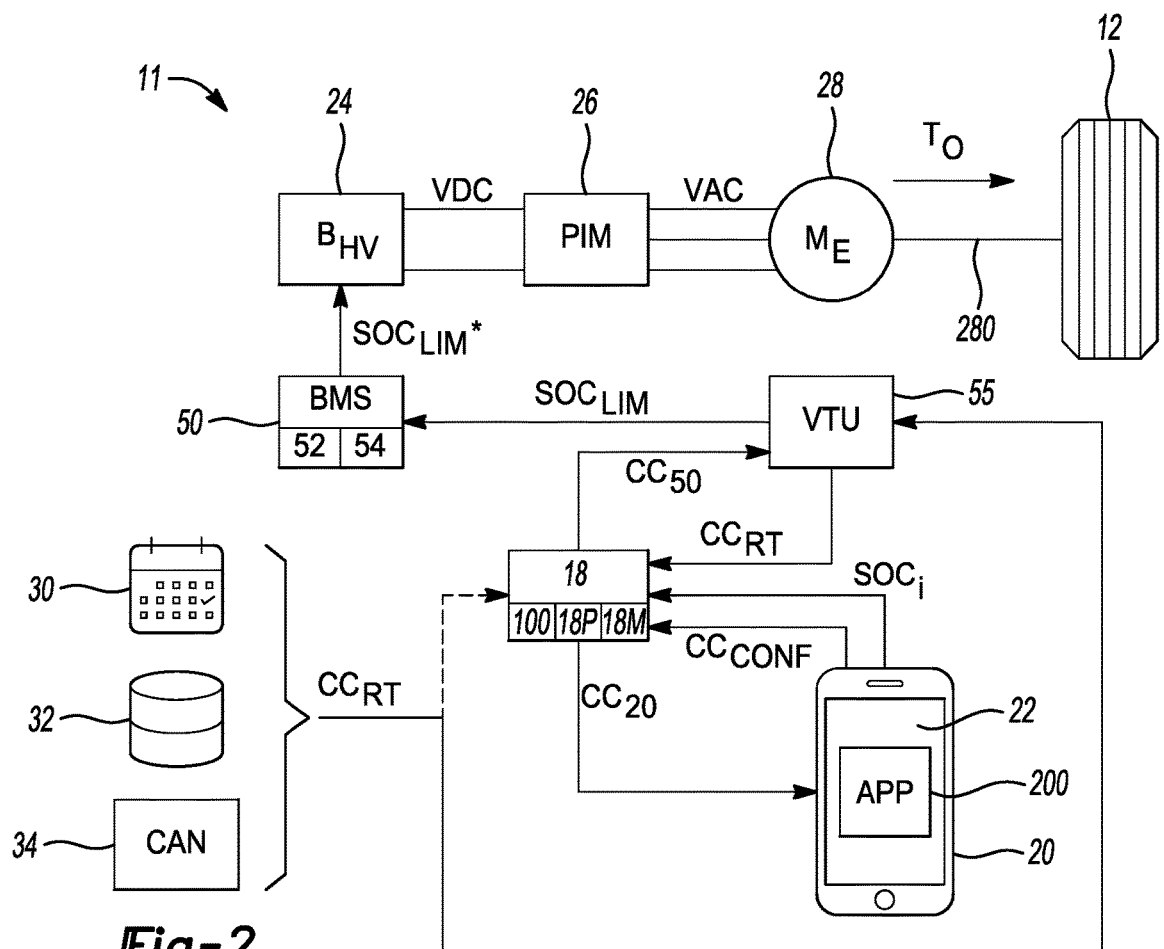
FIG. 2 is a representative embodiment of a motor vehicle having an onboard controller in communication with the user device of FIG. 1 when performing the disclosed method.

Referring to FIG. 2, the electrified powertrain system 11 in a possible embodiment includes the above-noted high-voltage propulsion battery pack ($B_{HV}$) 24, a power inverter module (PIM) 26, and a single or polyphase electric traction motor ($M_E$) 28. The propulsion battery pack 24, which is shown in simplified form for illustrative clarity, includes a plurality of electrochemical battery cells, e.g., prismatic, cylindrical, or pouch-style battery cells as appreciated in the art. During discharging modes, the propulsion battery pack 24 outputs a DC voltage to a DC voltage bus (VDC), e.g., at a relatively high voltage level of 400V or more in a possible implementation. The PIM 26 receives the DC voltage from the battery pack 24 as an input voltage and, in response to pulse width modulation or other suitable switching control signals to multiple IGBTs, MOSFETs, or other suitable semiconductor switches (not shown) residing in the PIM 26 as appreciated in the art, inverts the same to provide an AC output voltage on an AC voltage bus (VAC) at a level suitable for energizing the traction motor 28. The energized traction motor 28 is caused to rotate, thereby transmitting motor output torque (To) to a driven load via an output member 280, in this case to one or more road wheels 12 of the motor vehicle 10 shown in FIG. 1.

The electrified powertrain system 11 is also equipped with the controller, in this instance depicted as the BMS 50 operable for regulating performance of the battery pack 24. The BMS 50 includes more processors 52, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The BMS 50 also includes an associated computer-readable storage medium, i.e., non-transitory computer storage medium 54 inclusive of read only, programmable read only, random access, a hard drive, etc., whether resident, remote or a combination of both.

The motor vehicle 10 of FIG. 1 may also include a vehicle telematics unit (VTU) 55 in communication with the BMS 50 or integral therewith. As understood in the art, the VTU 55 includes communications hardware and software for establishing a remote connection with an external device, in this exemplary instance including the host computer 18. The user device 20 is thus able to communicate with the BMS 50 within the scope of the preset disclosure via the intervening host computer 18 and the VTU 55.

With respect to the VTU 55, although shown schematically for illustrative simplicity, those skilled in the art will appreciate that this hardware and software componentry of the motor vehicle 10 enables wirelessly communication, e.g., via cell towers, base stations, mobile switching centers, satellite service, etc., with a remotely located or "off-board" cloud computing host service such as ONSTAR®. Long-range communication capabilities with remote, off-board devices, including the user device 20 of FIGS. 1 and 2, may be provided via a cellular chipset/component, a navigation and location chipset/component (e.g., global positioning system (GPS) transceiver), and/or a wireless internet protocol (IP) modem, as appreciated in the art. Close-range wireless connectivity may be provided via a short-range communication (SRC) device such as a BLUETOOTH® unit or near field communications (NFC) transceiver, a dedicated short-range communications (DSRC) component, and/or a dual antenna.

As part of the present strategy, the host computer 18 is provided with initial state of charge (SOC) limits of the propulsion battery pack 24, with such initial SOC limits represented in FIG. 2 as $SOC_i$. Additionally, the host computer 18 receives the pre-drive information set $CC_{RT}$ and then identifies, from the pre-drive information set $CC_{RT}$, a probability of the motor vehicle 10 embarking on a road trip. The probability of the road trip ultimately triggers SOC control actions of the BMS 50.

Figure 3:
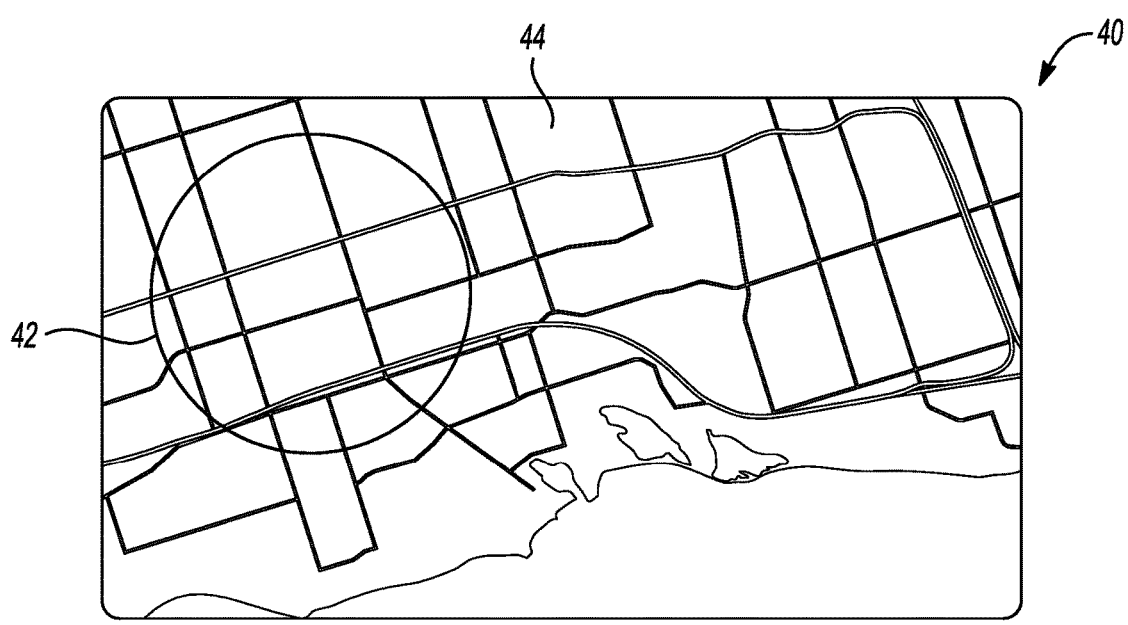
FIG. 3 is a representative map showing a geofenced area usable in the scope of the present disclosure.

Referring briefly to the map 40 of FIG. 3, the road trip may be a vehicle drive event in which the motor vehicle 10 of FIG. 1 will travel outside of a predetermined drive area 42, e.g., within a surrounding area 44. For instance, the predetermined drive area 42 could be a geofenced area for the motor vehicle 10, e.g., based on its vehicle identification number (VIN), having boundaries corresponding to the origin and destination coordinates of normal everyday use of the motor vehicle 10, such as when commuting to and from work, school, grocery stores, etc. Such trips form a historical database 32 as shown in FIG. 2, e.g., sets of latitude and longitude pairs representing the past trips. The host computer 18 could construct a $95^{th}$ percentile of distances from the user's home in the form of a radius or bounding box. Such boundaries could be set via machine learning or as static limits by the user, e.g., via the app 200. The host computer 18, working in conjunction with the BMS 50 and possibly the user device 20, may temporarily expand the initial SOC limits ($SOC_i$) when the motor vehicle 10 is about to embark on such a road trip, such that a total SOC operating window of the propulsion battery pack 24 of FIG. 2 is temporarily increased for a duration of the road trip.

Referring again to FIG. 2, the pre-drive information set $CC_{RT}$ may include information obtained from a calendar or database 30, e.g., of holidays, vacations, and/or weekends, with the overall population of information from the calendar or database 30 collectively describing driving behavior than may be used to determine likely road trip events on certain days or dates. As contemplated herein, such information could be from a much wider population than just the user, e.g., fleet-wide data, local, regional, or national patterns in road trips, etc. The host computer 18, alone or in conjunction with communication with the user device 20, could access such calendar/database information to determine if the current date corresponds to past days or dates on which the user or other similar users in the user's local area or region left on a road trip. For instance, if the user leaves for a ski trip the first week of February each year, or regularly departs for a vacation home the last weekend of every month, such calendar information could be used to anticipate that the user may embark on such a road trip on the same date(s).

In a similar vein, the pre-drive information set $CC_{RT}$ could also include trip distance information from the historical database 32 of past drive events of the motor vehicle 10, as alluded to above. The processor 18P of the host computer 18 may construct the predetermined drive area 42 of FIG. 2 as a geofenced area, as noted above, e.g., using corresponding drive distances of the past drive events, such as drive events completed in the last few weeks or months. The host computer 18 then constructs a normal drive history from such drive events, possibly treating departures from this area as corresponding to a road trip.

The pre-drive information set $CC_{RT}$ may also be embodied as electronic signals from a controller area network (CAN) bus 34 of the motor vehicle 10, with such signals being indicative of the road trip. By way of example and not of limitation, representative signals that may be received from the CAN bus 34 may include door and/or trunk opening/closing signals indicative of doors and trunks of the motor vehicle 10 being opened and closed in a particular sequence, a vehicle weight of the motor vehicle 10, or other signals possibly indicative of loading of the motor vehicle 10 for an extended road trip.

In some implementations, the host computer 18, alone or in conjunction with the BMS 50, may transmit the user prompt $CC_{20}$ to the user device 20 in response to the motor vehicle 10 being about to embark on the road trip. In such an embodiment, the host computer 18 may receive a confirmation signal ($CC_{CONF}$) from the user device 20 that the motor vehicle 10 is about to embark on the road trip, with the host computer 18 temporarily expanding the initial SOC limits ($SOC_i$) in response to the confirmation signal ($CC_{CONF}$) via SOC control signals ($SOC_{LIM}^*$).

Referring to FIG. 4, the method 100 according to an exemplary embodiment may commence at block B102 ("REC $SOC_i$") with recording the initial state of charge limits ($SOC_i$) of the battery pack 24 shown in FIG. 2. For example, a user may open the app 200 using the user device 20 of FIGS. 1 and 2 and thereafter enter the initial state of charge limits ($SOC_i$). The initial state of charge limits ($SOC_i$) are then transmitted to the motor vehicle 10 via the VTU 55 and recorded in a non-transitory computer storage medium, e.g., the memory 18M of the host computer 18 and/or the memory 54 of the BMS 50. The method 100 then proceeds to block B104.

At block B104 ("ENF $SOC_i$"), the BMS 50 enforces the initial state of charge limits ($SOC_i$) aboard the motor vehicle 10. That is, when charging or discharging the battery pack 24 of FIG. 2, the BMS 50 maintains the actual SOC of the battery pack 24 within the range defined by the initial state of charge limits (SOC). The method 100 then proceeds to block B106. Block B106 ("REC $CC_{RT}$") of FIG. 4 entails receiving the pre-drive information set $CC_{RT}$ via the host computer 18. Block B106 may include providing at least some of the pre-drive information set $CC_{RT}$ to the motor vehicle 10 via the VTU 55, or the BMS 50 may already store the pre-drive information set $CC_{RT}$ in its memory 18M. The method 100 proceeds to block B108 after receiving the pre-drive information set $CC_{RT}$.

Block B108 ("RT?") includes identifying, from the pre-drive information set $CC_{RT}$, a probability of the motor vehicle 10 embarking on a road trip, i.e., a vehicle drive event in which the motor vehicle 10 will travel outside of the predetermined drive area 42 (FIG. 3). The host computer 18 may do so by weighting the various information of the pre-drive information set $CC_{RT}$. The method 100 repeats block B104 when the pre-drive information set $CC_{RT}$ is not representative of a probable road trip, i.e., the host computer 18 and BMS 50 resume enforcing the initial SOC limits ($SOC_i$), or when the motor vehicle 10 returns to the predetermined drive area 42 of FIG. 2, and to block B110 in the alternative.

Block B110 ("$SOC_{LIM}=SOC_{i,exp}$") includes temporarily expanding the initial SOC limits ($SOC_i$) via the host computer 18 and the BMS 50 when the motor vehicle 10 is about to embark on the road trip, such that a total SOC operating window of the propulsion battery pack 24 is temporarily increased for a duration of the road trip. Block B110 could entail opening up the SOC operating window to its full 0-100% range, or increasing the limits a predetermined amount from those of the initial limits ($SOC_i$) set at block B102 to a higher value that remains less than 100%. The method 100 then proceeds to block B112.

Block B112 ("ENF $SOC_{LIM}$") includes enforcing the new SOC limits, a step which is analogous to block B104 but uses a temporarily-expanded SOC window. The method 100 then returns to block B106.

The present teachings therefore enable a user of the app 200 to manually or automatically override SOC control of the battery pack 24 in the presence of long road trips. In response to a determination by the host computer 18 that a road trip is indeed probable, the user could be prompted via the user prompts $CC_{20}$ to confirm a desire to disable the initial SOC limits ($SOC_i$). Or, the user could enter typical route planning information into the app 200 or a navigation system aboard the motor vehicle 10, inclusive of destination coordinates, with the host computer 18 calculating mileage and comparing the same to the boundaries of the predetermined drive area 42 (FIG. 3). Comparison could be via spatial comparison of a geographic information system (GIS) spatial join, or through haversine distance measurement in the cloud. The host computer 18 could then disable SOC control by the BMS 50 when the trip proceeds beyond such defined boundaries.

Likewise, the host computer 18 could rely on statistical methods or machine learning models, e.g., decision trees or clustering for anomalies in the pre-trip data set $CC_{RT}$, that considers both population and individual customers as well as other predictors to determine a likelihood of the road trip, and to suggest temporary disablement of SOC control. Given a certain probability threshold in such an embodiment, the host computer 18 could prompt the user via the user prompt $CC_{20}$ whether a long road trip was indeed upcoming, and to suggest disabling the SOC control. Such disabling could then be enacted in response to the confirming signal ($CC_{CONF}$) of FIG. 2.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling a propulsion battery pack aboard a battery electric vehicle, comprising:
   recording initial state of charge (SOC) limits of the propulsion battery pack;
   receiving a pre-drive information set via a host computer;
   constructing, via the host computer using the pre-drive information set, a bounding box of distances from a home of a user of the battery electric vehicle, the bounding box of distances describing the user's normal everyday use of the battery electric vehicle;
   identifying, from the pre-drive information set, a probability of the battery electric vehicle embarking on a road trip, wherein the embarking on the road trip is a vehicle drive event in which the battery electric vehicle will travel outside of a predetermined drive area corresponding to an area of the bounding box;
   temporarily expanding the initial SOC limits via the host computer in response to the probability of the battery electric vehicle embarking on the road trip, such that a total SOC operating window of the propulsion battery pack is temporarily increased to an expanded SOC operating window for a duration of the road trip; and
   maintaining an actual SOC of the propulsion battery pack within the expanded SOC operating window for the duration of the road trip.

2. The method of claim 1, wherein receiving the pre-drive information set includes accessing a historical database of past drive events of the battery electric vehicle, wherein the bounding box of distances is a bounding box of $95^{th}$ percentile distances from the home of the user.

3. The method of claim 2, further comprising:
   constructing a geofenced area using corresponding drive distances of the past drive events of the battery electric vehicle; and
   using the geofenced area as the predetermined drive area.

4. The method of claim 3, further comprising:
   re-enabling the initial SOC limits when the battery electric vehicle returns to the geofenced area.

5. The method of claim 1, wherein receiving the pre-drive information set includes accessing a calendar or database of holidays, vacations, and/or weekends.

6. The method of claim 1, wherein receiving the pre-drive information set includes receiving signals from a controller area network (CAN) bus indicative of the road trip.

7. The method of claim 5, wherein receiving the signals from the CAN bus includes receiving door opening/closing signals, trunk opening/closing signals, and/or a vehicle weight of the battery electric vehicle.

8. The method of claim 1, wherein identifying the probability of the battery electric vehicle embarking on the road trip is accomplished by the host computer using machine learning or statistical methods.

9. The method of claim 1, further comprising:
   transmitting a user prompt to a user device in response to the probability of the battery electric vehicle embarking on the road trip;
   receiving a confirmation signal from the user device that the battery electric vehicle is about to embark on the road trip; and
   temporarily expanding the initial SOC limits in response to the confirmation signal.

10. A system for controlling a propulsion battery pack aboard a battery electric vehicle, comprising:
    a processor; and
    a non-transitory computer-readable storage medium on which is recorded an instruction set, wherein executing the instruction set by the processor causes the processor to:
    determine initial state of charge (SOC) limits of the propulsion battery pack;
    receive a pre-drive information set of the battery electric vehicle;

construct a bounding box of distances from a home of a user of the battery electric vehicle using the pre-drive information set, the bounding box of distances describing the user's normal everyday use of the battery electric vehicle;

identify, from the pre-drive information set, a probability of the battery electric vehicle embarking on a road trip, wherein the embarking on the road trip is a vehicle drive event in which the battery electric vehicle will travel outside of a predetermined drive area corresponding to an area of the bounding box;

temporarily increase the initial SOC limits to an expanded SOC operating window when the motor vehicle is about to embark on the road trip, such that a total SOC operating window of the propulsion battery pack is increased to an expanded SOC operating window for a duration of the road trip; and maintaining an SOC of the propulsion battery pack within the expanded SOC operating window for the duration of the road trip.

11. The system of claim 10, wherein executing the instruction set by the processor causes the processor to receive the pre-drive information set from a historical database of past drive events of the battery electric vehicle, wherein the bounding box of distances is a bounding box of $95^{th}$ percentile distances from the home of the user.

12. The system of claim 11, wherein executing the instruction set by the processor causes the processor to construct a geofenced area using corresponding drive distances of the past drive events; and
use the geofenced area as the predetermined drive area.

13. The system of claim 12, wherein executing the instruction set by the processor causes the processor to re-enable the initial SOC limits via the controller when the battery electric vehicle returns to the geofenced area.

14. The system of claim 10, wherein executing the instruction set by the processor causes the processor to receive the pre-drive information set from a calendar or database of holidays, vacations, and/or weekends.

15. The system of claim 10, wherein executing the instruction set by the processor causes the processor to receive the pre-drive information set as signals from a controller area network (CAN) bus, wherein the signals are indicative of the road trip.

16. The system of claim 10, wherein executing the instruction set by the processor causes the processor to:
transmit a prompt to a user device in response to the battery electric vehicle being about to embark on the road trip;
receive a confirmation signal from the user device that the battery electric vehicle is about to embark on the road trip; and
temporarily expand the initial SOC limits in response to the confirmation signal.

17. The system of claim 10, wherein the processor and the non-transitory computer-readable storage medium are components of a battery management system of the battery electric vehicle.

18. A method for controlling a propulsion battery pack aboard a battery electric vehicle, comprising:
recording initial state of charge (SOC) limits of the propulsion battery pack;
receiving a pre-drive information set via a host computer, including:
accessing a historical database of past drive events of the battery electric vehicle;
accessing a calendar or database of holidays, vacations, and/or weekends; and
receiving signals from a controller area network (CAN) bus indicative of a road trip, wherein the road trip is a vehicle drive event in which the battery electric vehicle will travel outside of a predetermined drive area;
constructing a bounding box of $95^{th}$ percentile distances from a home of a user of the battery electric vehicle using the pre-drive information set, the $95^{th}$ percentile of distances describing the user's normal everyday use of the battery electric vehicle;
identifying, from the pre-drive information set, a probability of the battery electric vehicle embarking on the road trip, wherein the embarking on the road trip is a vehicle drive event in which the battery electric vehicle will travel outside of a predetermined drive area corresponding to an area of the bounding box; and
temporarily increasing the initial SOC limits to an expanded SOC operating window via the host computer when the battery electric vehicle is about to embark on the road trip, such that a total SOC operating window of the propulsion battery pack is increased to an expanded SOC operating window for a duration of the road trip;
maintaining an SOC of the propulsion battery pack within the expanded SOC operating window for the duration of the road trip; and
re-enabling the initial SOC limits via the host computer when the motor vehicle returns to the predetermined drive area.

19. The method of claim 18, further comprising:
transmitting a user prompt to a user device in response to the probability of the battery electric vehicle embarking on the road trip;
receiving a confirmation signal from the user device that the battery electric vehicle is about to embark on the road trip; and
temporarily expanding the initial SOC limits in response to the confirmation signal.

20. The method of claim 18, further comprising:
constructing a geofenced area using corresponding drive distances of the past drive events of the battery electric vehicle; and
using the geofenced area as the predetermined drive area.

* * * * *